March 14, 1944. F. A. GROSSMAN 2,344,245
REFRIGERATION
Filed May 13, 1941
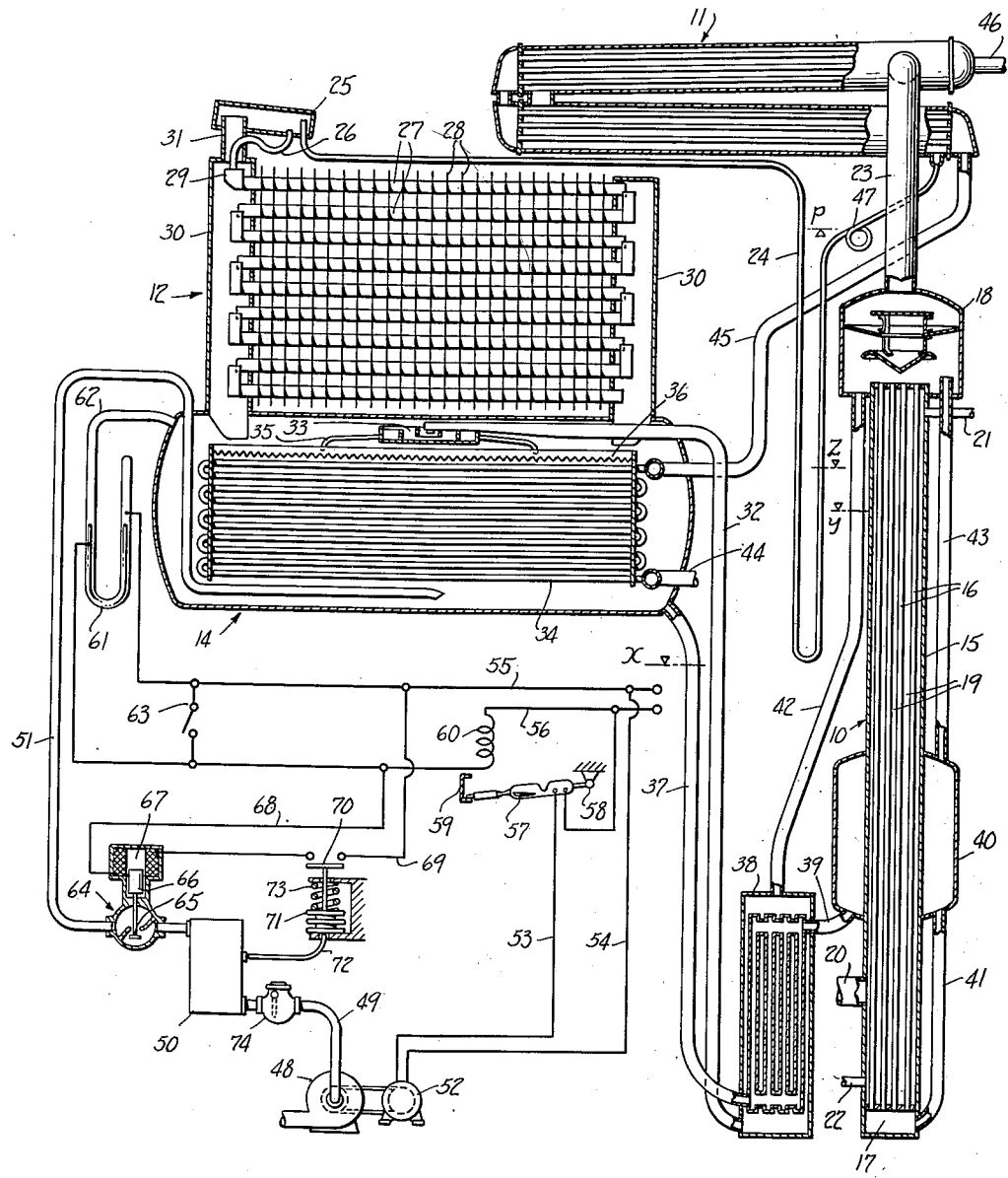
INVENTOR.
Franklin A. Grossman
BY
his ATTORNEY Patented Mar. 14, 1944

2,344,245

UNITED STATES PATENT OFFICE 2,344,245

REFRIGERATION

Franklin A. Grossman, Evansville, Ind., assignor to Servel, Inc., New York, N. Y., a corporation of Delaware Application May 13, 1941, Serial No. 393,160

10 Claims. (Cl. 62—5)

This invention relates to refrigeration, and is more particularly concerned with non-condensible gases that collect in refrigeration systems.

It is the object of this invention to provide an improvement for controlling removal of non-condensible gases from refrigeration systems. This is accomplished by providing a suitable vacuum pump to effect removal of non-condensible gases from a refrigeration system, and operating the pump within a definite pressure range in the refrigeration system.

The above and other objects and advantages of the invention will be better understood from the following description taken in conjunction with the accompanying drawing forming a part of this specification, and of which the single figure more or less diagrammatically illustrates a refrigeration system with which the invention is associated.

Referring to the drawing, the present invention is embodied in a two-pressure absorption refrigeration system like that described in Patent No. 2,282,503 of A. R. Thomas and P. P. Anderson, Jr., issued May 12, 1942. A system of this type operates at low pressures and includes a generator or vapor expeller 10, a condenser 11, an evaporator 12, and an absorber 14 which are interconnected in such a manner that the pressure differential in the system is maintained by liquid columns.

The disclosure in the aforementioned Thomas and Anderson application may be considered as being incorporated in this application, and, if desired, reference may be had thereto for a detailed description of the refrigeration system. As shown, the generator 10 includes an outer shell 15 within which are disposed a plurality of vertical riser tubes 16 having the lower ends thereof communicating with a space 17 and the upper ends thereof extending into and above the bottom of a vessel 18. The space 19 within shell 15 forms a steam chamber about the tubes 16 to which steam is supplied through a conduit 20. The space 19 provides for full length heating of tubes 16, a vent 21 being formed at the upper end of shell 15. A conduit 22 is connected to the lower part of shell 15 for draining condensate from space 19.

The system operates at a partial vacuum and contains a water solution of refrigerant in absorbent liquid, such as, for example, a water solution of about 40% lithium chloride by weight. With steam being supplied through conduit 20 to space 19 at atmospheric pressure, heat is applied to tubes 16 whereby water vapor is expelled from solution. The absorption liquid is raised by gas or vapor-lift action with the expelled water vapor forming a central core within an upwardly rising annulus of the liquid. The expelled water vapor rises more rapidly than the liquid with the liquid following along the inside walls of tubes 16.

The water vapor flows upwardly through the tubes or risers 16 into vessel 18 which serves as a vapor separator. Due to baffling in vessel 18, water vapor is separated from raised absorption solution and flows through conduit 23 into condenser 11. The condensate formed in condenser 11 flows through a U-tube 24 into a flash chamber 25 and from the latter through a conduit 26 into evaporator 12.

The evaporator 12 includes a plurality of horizontal banks of tubes 27 disposed one above the other and to which are secured heat transfer fins 28 to provide a relatively extensive heat transfer surface. The liquid flowing to evaporator 12 is divided in any suitable manner for flow through the uppermost banks of tubes 27. The dividing of liquid may be effected by providing a liquid distributing trough 29 into which the liquid flows through the conduit 26. The water passes through successively lower banks of tubes through suitable end connections which are open to permit escape of vapor from the tubes, and any excess liquid is discharged from the lowermost bank of tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 28 passes out into end headers 30 which are connected at their lower ends to absorber 14. The flash chamber 25 is provided to take care of any vapor flashing of liquid being fed to evaporator 12 through U-tube 24. The flashed vapor formed in the initial cooling of the liquid flowing from condenser 11 passes through a conduit 31 into one of the headers 30 and mixes with vapor formed in the evaporator 12, so that disturbances in the evaporator due to vapor flashing are avoided.

In absorber 14 refrigerant vapor is absorbed into concentrated absorption liquid which enters through a conduit 32. The entering absorption liquid flows into a vessel 33 in which liquid is distributed laterally or cross-wise of a plurality of vertically dispcsed pipe banks 34 which are arranged along side of each other. The liquid flows from vessel 33 through conduits 35 into a plurality of liquid holders and distributors 36 which extend lengthwise of and above the uppermost horizontal branches of pipe banks 34. Absorption liquid is siphoned over the walls of the liquid holders 36 to effect complete wetting of the uppermost pipe sections. Liquid drips from each horizontal pipe section onto the next lower pipe section, whereby all of the pipe sections are wetted with a film of liquid.

The water vapor formed in evaporator 12 passes through the headers 30 into the absorber 14 where it is absorbed by the absorption liquid and, due to such absorption of water vapor, the absorption liquid is diluted. The diluted absorption liquid flows through a conduit 37, a first passage in liquid heat exchanger 38, conduit 39, vessel 40 and conduit 41 into the lower space 17 of generator 10. Water vapor is expelled out of solution in generator 10 by heating, and the solution is raised by gas or vapor-lift action in riser tubes 16, as explained above.

The absorption liquid in vessel 18 is concentrated since water vapor has been expelled therefrom in generator 10. This concentrated absorption liquid flows through a conduit 42, a second passage in liquid heat exchanger 38, and conduit 32 into the upper part of absorber 14. This circulation of absorption liquid results from the raising of liquid by vapor-lift action in vertical riser tubes 16, whereby the liquid can flow to absorber 14 and return from the latter to the generator 10 by force of gravity.

The vessel 40 is cylindrical in shape and disposed about shell 15 of generator 10. By arranging vessel 40 to receive heat derived from the steam in space 19, preheating of absorption liquid flowing to generator 10 is effected. The upper part of vessel 40 is connected by a conduit 43 to vessel 18, so that the pressure in vessel 40 is equalized with the pressure in the upper part of generator 10 and condenser 11.

The heat liberated with absorption of water vapor in absorber 14 is transferred to a cooling medium, such as water, for example, which flows upward through the vertically disposed pipe banks 34. The cooling medium enters the lower ends of the pipe banks 34 through a conduit 44 and leaves the upper ends of the pipe banks 34 through a conduit 45. The conduit 45 is connected to condenser 11 whereby the same cooling medium may be utilized to cool both condenser 11 and absorber 14, and from condenser 11 the cooling medium flows through a conduit 46 to waste.

The system operates at low pressures with the generator 10 and condenser 11 operating at one pressure and the evaporator 12 and absorber 14 operating at a lower pressure, the pressure differential therebetween being maintained by liquid columns.

Thus, the liquid column formed in tube 24 maintains the pressure differential between condenser 11 and evaporator 12, the liquid column in conduit 37 maintains the pressure differential between the outlet of absorber 14 and generator 10, and the liquid column formed in conduit 32 and connected parts including conduit 42 maintains the pressure differential between the inlet of the absorber and the upper part of generator 10. In operation, the liquid columns may form in conduits 37, 42 and down-leg of tube 24 to the levels $x$, $y$ and $z$, for example. The conduits are of such size that restriction to gas flow is effected without appreciably restricting flow of liquid.

The liquid column formed in vessel 40 and conduit 41 provides the liquid reaction head for raising liquid in riser tubes 16 by vapor-lift action. The vessel 40 is of sufficient volume to hold the liquid differential in the system and is of such cross-sectional area that the liquid level therein does not appreciably vary, so that a substantially constant reaction head is provided for lifting liquid in generator 10.

During operation of the refrigeration system, non-condensible gases may collect therein, and in condenser 11 the non-condensible gases are concentrated in the dead-end or bottom part due to the sweeping action of the inflowing vapor. To remove non-condensible gases from condenser 11 to absorber 14 in the low pressure side of the system a liquid siphon trap is provided in conduit 24, as described in an application of Philip P. Anderson, Jr., Serial No. 350,883, filed August 3, 1940. The siphon trap 47 may be of any desired shape and is shown in the form of a complete circular loop in the down-leg of U-tube 24.

The liquid formed in condenser 11 flows into loop 47. When the circular loop is completely filled with liquid to the level $p$, the liquid is siphoned from the loop into the down-leg of U-tube 24. The gas in the down-leg of U-tube 24, between the loop 47 and liquid level $z$, is trapped by the liquid siphoned from the loop. Immediately after liquid has siphoned from the loop, gas passes from the bottom part of condenser 11 through the loop 47 into the down-leg of U-tube 24. When liquid flowing from condenser 11 again reaches the level $p$ in the circular loop 47, liquid is again siphoned into the down-leg of the tube 24. In this manner gas passing from condenser 11 into the down-leg of tube 24, before the liquid seal is formed in loop 47, is segregated by the liquid subsequently siphoned into the down-leg of the tube.

The gas segregated between the successive bodies of liquid siphoned from loop 47 is compressed by the siphoned liquid and passes through the U-tube by the gravity flow of liquid from condenser 11 to evaporator 12. In this way non-condensible gases collecting in the upper part of generator 10 and condenser 11 are removed or transferred from these parts of the system to the evaporator 12 and absorber 14 to which is connected a vacuum pump 48 for removing non-condensible gases from the refrigeration system.

The vacuum pump 48 is provided to remove non-condensible gases from the low pressure side of the refrigeration system through a conduit 49, vessel 50 and conduit 51. The conduit 51 extends into the lower part of absorber 14 to which region the non-condensible gases are swept by the high velocity water vapor flowing into the absorber from evaporator 12.

The vacuum pump 48 is operated by an electric motor 52 which is connected through conductors 53, 54 and 55, 56 to a suitable source of electrical energy. In conductor 53 is provided a mercury switch 57 of the well-known tilt-type which is pivoted at 58 and movable between definite limits, as between the arms of a U-shaped member 59. The switch 57 forms part of a lever which serves as an armature element adapted to be raised and attracted toward a relay coil 60 when the latter is energized. With raising of switch 57 the contacts therein are bridged by a body of mercury to complete the electric circuit for motor 52. It is recommended that switch 57 be of the type provided with a dam or restriction, as shown in the drawing, for delaying the flow of mercury. This prevents chattering of the control switches when the mercury in the manometer is floating at a control point.

The coil 60 is connected in conductor 56 which is connected in the left hand arm of a manometer 61. The conductor 55 is connected in the closed or right hand arm of the manometer 61. The manometer contains a suitable liquid, such as, for example, mercury or the like, and is connected by a tube 62 to the upper part of the absorber. When the pressure prevailing in the absorber 14 is such that the mercury contained in the manometer simultaneously contacts conductors 55 and 56, an electric circuit is completed for coil 60 to effect closing of switch 57. A manual switch 63 is connected between conductors 55 and 56 across the manometer 61, so that a circuit can be completed for coil 60 even when the mercury in the manometer does not contact conductors 55 and 56 at the same time.

A solenoid valve 64 is provided in conduit 51 and includes a valve member 65 which is operatively connected to a plunger 66. The plunger 66 is adapted to be raised within a coil 67 when the latter is energized, thereby moving valve member 65 to its closed position. The coil 67 is connected by conductors 68 and 69 to conductors 55 and 56 with a relay 70 provided in one of the conductors. The relay 70 is operatively connected to an expansible and contractible bellows 71 which in turn is connected by a tube 72 to vessel 50. When the pressure in vessel 50 becomes sufficiently low, the bellows 71 contracts to move the arm of relay 70 downward to open the circuit for coil 67 of solenoid valve 64. A spring 73 cooperates with bellows 71 to insure opening of relay 70 when the pressure within the bellows falls to a predetermined low value.

A suitable check valve 74 is provided in conduit 49 to prevent atmospheric air from entering vessel 50 and conduit 51 when the motor 52 is disconnected from the source of electrical supply and the vacuum pump 48 is rendered inoperative.

In the kind of refrigeration system described above, the normal operating pressure desired to be maintained in absorber 14 may be in the neighborhood of 9 mm. Hg. In this case the conductor 55 is located at such a position at the closed or right-hand arm of manometer 61 that, when the pressure in absorber 14 tends to increase above 9 mm. Hg, the mercury column in the right-hand arm contacts conductor 55. The conductor 56 is located at such a position at the left-hand arm that, when the pressure in absorber 14 tends to rise above 9 mm. Hg, this conductor is also contacted by mercury. With the mercury in manometer 61 simultaneously contacting conductors 55 and 56, the electric circuit for coil 60 is completed whereby switch 57 is attracted and raised upwardly. With switch 57 in its raised position the body of mercury bridges the contacts in the right-hand part of the bulb to complete the electrical circuit for motor 52. Energization of motor 52 starts vacuum pump 48 whereby air within conduit 49 and vessel 50 is withdrawn therefrom and discharged into the atmosphere.

When the pressure in vessel 50 reaches a predetermined low value due to operation of vacuum pump 48, the bellows 71 contracts sufficiently to open relay 70. The spring 73 cooperates in the opening of relay 70 whereby the circuit for coil 67 of solenoid valve 64 is opened. With deenergization of coil 67 valve member 65 no longer will be held in its upper position by electromagnetic attraction and will move downward to its open position by gravity action. The opening of valve member 65 renders vacuum pump 48 effective to withdraw non-condensible gases from absorber 14 and to discharge such gases to the atmosphere. Since it has been assumed above that operation of vacuum pump 48 is started when the pressure in absorber 14 tends to rise approximately above 9 mm. Hg, it will be understood that under these conditions relay 70 and its associated bellows 71 are adjusted to effect opening of valve member 65 only after the pressure in vessel 50 has been reduced to a very low value and preferably at or below 9 mm. Hg.

When substantially all of the objectionable non-condensible gases have been removed from the refrigeration system to lower the pressure in absorber 14 to a sufficiently low value so that the mercury column in the right-hand arm of manometer 61 no longer contacts conductor 55, the circuit for coil 60 is opened and switch 57 falls to its lower open position. This permits the mercury in the switch to flow by gravity toward the left-hand end of the bulb to open the contacts therein and disconnect motor 52 from the source of electrical supply. With motor 52 no longer energized and vacuum pump 48 no longer operating, the pressure in conduit 49 increases to atmospheric pressure. When the vacuum pump 48 ceases operating, however, the check valve 74 immediately becomes effective to prevent atmospheric air from entering vessel 50 through conduit 49. In the event of faulty operation of check valve 74 with resultant rise in pressure in vessel 50, the bellows 71 will expand against the action of spring 73 to close relay 70 and complete the electric circuit for coil 67. When this occurs plunger 66 is raised within coil 67 against the force of gravity to effect closing of valve member 65.

The conductor 56 preferably is located at such a height in the left-hand arm of manometer 61 that, when the pressure in absorber 14 exceeds a predetermined value, the mercury in the left-hand column will be below the position of conductor 56. In such case, of course, the conductor 56 will not be contacted by mercury and the circuit for coil 60 will be opened. Under these conditions switch 57 opens to disconnect motor 52 from the source of electrical supply and vacuum pump 48 becomes inoperative to effect withdrawal of non-condensible gases from the refrigeration system.

In a refrigeration system of the character referred to above in which the pressure in absorber 14 normally is about 9 mm. Hg, the conductor 56 may be connected in the left-hand arm of manometer 61 at such a position that the circuit for coil 60 will be opened when the absorber pressure exceeds 16 mm. Hg, for example. This is the pressure that may prevail in absorber 14 when the refrigeration system is shut down with no steam being supplied through conduit 20, and with evaporator 12 at a temperature of 65° F. or higher. This is particularly true when the evaporator 12 is positioned in the same air duct as a heater which is used for heating air during the periods of the year when the refrigeration system is not being operated. The pressure in evaporator 12 and absorber 14 may be in a range from 16 to 22 mm. Hg for a corresponding air temperature range from 65 to 75° F.

Hence, when the refrigeration system is shut down and an associated heater is operating to effect heating of air, the control provided is automatically operative to render vacuum pump 48 inoperative during such heating periods even though the absorber pressure is above the normal operating value at which the vacuum pump usually becomes operative to withdraw non-condensible gases from the refrigeration system.

In view of the foregoing, it will be apparent that an improved control has been provided which is operative in a predetermined pressure range of the refrigeration system to control operation of a vacuum pump for removing non-condensible gases from the system. Moreover, the control provided is of such a character that it is completely automatic and may be employed with a heating system which, together with the refrigeration system described, provides for year round conditioning of air.

While a single embodiment of the invention has been shown and described, it will be apparent to those skilled in the art that various modifications and changes may be made without departing from the spirit and scope of the invention, as pointed out in the following claims.

What is claimed is:

1. In refrigeration apparatus of the two-pressure absorption type having a plurality of interconnected parts to form a system for circulation of a refrigerant and an absorption solution, means for transferring non-condensible gases from a part of the system at one pressure to another part of the system at a different pressure, a vacuum pump connected to said other part for removing non-condensible gases from the system, and means responsive to pressure in said other part for causing operation of said vacuum pump when the pressure in said other part is within a predetermined range and stopping said operation when the pressure is below or above said range.

2. In refrigeration apparatus of the absorption type having a plurality of interconnected parts to form a system for circulation of a refrigerant and an absorption solution and in which non-condensible gases may collect, a vacuum device connected to one of said parts for removing non-condensible gases from the system, means responsive to rise of pressure in the system to a predetermined value for rendering said device operative and responsive to an additional increase in pressure in the system to a second predetermined value for rendering said device inoperative.

3. In refrigeration apparatus of the absorption type having a plurality of interconnected parts to form a system for circulation of a refrigerant and an absorption solution and in which non-condensible gases may collect, a vacuum device and a connection therefrom to a part of said system for exhausting non-condensible gases therefrom, a valve in said connection, and structure responsive to increase of pressure in said part to a predetermined value for rendering said device operative, said structure being so constructed and arranged that said valve is caused to open after the pressure in said connection between said valve and said device has been reduced to a definite low value due to operation of said device.

4. In refrigeration apparatus of the absorption type having a plurality of interconnected parts to form a system for circulation of a refrigerant and an absorption solution and in which non-condensible gases may collect, a vacuum device and a connection therefrom to a part of said system, structure responsive to increase in pressure in said part to a predetermined value for rendering said vacuum device operative, and self-operating valve means in said connection constructed and arranged to open with operation of said vacuum device and to close and shut off the system from atmosphere when said device is rendered inoperative by said structure.

5. In a refrigeration system subject to the appearance of non-condensible gases therein, a device connected to said system for withdrawing such gases, and a control device operative responsive to a pressure condition within the system to control operation of said gas withdrawing device so that the latter operates when the pressure within the system is within a predetermined range, but is inoperative when the pressure within the system is below or above such range.

6. The combination as in claim 5 in which said control device is electrically actuated and includes a manometer containing an electrically conductive liquid, said manometer being connected to said system so as to sense the pressure therein and having electrical contacts, one in each leg and at different elevations.

7. An absorption refrigeration system subject to appearance therein of non-condensible gases, and in which such non-condensible gases are swept to a part of the system by flow of fluid therein, a gas withdrawing device connected to said part at a region which is the most remote in the path through which said gases are swept, and a control device operative responsive to pressure in said system for rendering said gas withdrawing device operative within a certain range of pressures, and inoperative both above and below said range.

8. An absorption refrigeration system of the vacuum type subject to appearance of non-condensible gases therein, and in which the non-condensible gases are swept to a vacuum part of the system by flow of fluid in the system, a vacuum producer for withdrawing said gases and connected to said part at substantially the most remote region thereof to which said gases are swept, and a control device for rendering said vacuum producer operative within a certain range of pressures in said system, and inoperative both above and below said range.

9. An absorption type refrigeration system employing water as a refrigerant which is evaporated under vacuum conditions, said system being subject to appearance of non-condensible gases therein, a vacuum pump connected to said system and operative to withdraw said gases, a control device for controlling operation of said pump, said control device including an electric switch type manometer subjected to internal pressure in said system, and a relay, said manometric switch being constructed and arranged to energize said relay within a certain pressure range, and de-energize said relay both above and below said range, and said relay being operative to cause operation of said pump when energized.

10. In a refrigeration apparatus of the absorption type having a plurality of parts including a generator, a condenser, an evaporator, and an absorber interconnected to form a system for circulation of a refrigerant and an absorption solution and in which non-condensible gases may accumulate, a vacuum device connected to the system for exhausting non-condensible gases therefrom, and a control means responsive to an increase in pressure in the refrigeration system for rendering said vacuum device operative and responsive to a further increase in pressure corresponding to a temperature in the evaporator above 65° F. for rendering said vacuum device inoperative.

FRANKLIN A. GROSSMAN.